United States Patent
Srinivasan et al.

(10) Patent No.: US 7,983,266 B2
(45) Date of Patent: Jul. 19, 2011

(54) GENERALIZED SERIALIZATION QUEUE FRAMEWORK FOR PROTOCOL PROCESSING

(75) Inventors: Thirumalai Srinivasan, Menlo Park, CA (US); Sunay Tripathi, Palo Alto, CA (US); Nicolas G. Droux, San Jose, CA (US)

(73) Assignee: Open Computing Trust I, San Carlos, CA (US)

( * ) Notice: Subject to any disclaimer, the term of this patent is extended or adjusted under 35 U.S.C. 154(b) by 0 days.

(21) Appl. No.: 12/581,595

(22) Filed: Oct. 19, 2009

(65) Prior Publication Data
US 2010/0040063 A1    Feb. 18, 2010

Related U.S. Application Data

(63) Continuation of application No. 11/479,947, filed on Jun. 30, 2006, now Pat. No. 7,715,416.

(51) Int. Cl.
*H04L 12/56* (2006.01)
(52) U.S. Cl. ........ 370/392; 370/397; 370/399; 370/409; 370/412; 370/429

(58) Field of Classification Search .................. 370/412, 370/413, 414, 415, 416, 417, 418, 419, 420, 370/421
See application file for complete search history.

(56) References Cited

U.S. PATENT DOCUMENTS

| 5,852,630 A | * | 12/1998 | Langberg et al. | 375/219 |
| 7,260,102 B2 | * | 8/2007 | Mehrvar et al. | 370/412 |
| 2004/0240453 A1 | * | 12/2004 | Ikeda et al. | 370/395.21 |

* cited by examiner

*Primary Examiner* — Jayanti K Patel
*Assistant Examiner* — Bo Hui A Zhu
(74) *Attorney, Agent, or Firm* — Osha • Liang LLP (57) ABSTRACT

A method for processing packets. The method includes receiving a first packet, wherein the first packet is associated with a first protocol, classifying the first packet using a protocol associated with the first packet, sending the first packet to a first receive ring based on the classification, sending the first packet from the first receive ring to a first virtual network interface card (VNIC) based on an operating mode, sending the first packet from the first VNIC to a first protocol specific virtual network stack (VNS), wherein the first protocol specific VNS is configured to only process packets associated with the first protocol, and processing the first packet by the first protocol specific VNS to obtain a first processed packet.

8 Claims, 6 Drawing Sheets

GENERALIZED SERIALIZATION QUEUE FRAMEWORK FOR PROTOCOL PROCESSING

CROSS REFERENCE TO RELATED APPLICATIONS

This application is a continuation application and claims benefit under 35 U.S.C. §120 of U.S. patent application Ser. No. 11/479,947, filed on Jun. 30, 2006, entitled "Generalized Serialization Queue Framework For Protocol Processing," in the name of Thirumalai Srinivasan et al.

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Network Interface Card Virtualization Based On Hardware Resources and Software Rings" with U.S. application Ser. No. 11/479,046; "Method and System for Controlling Virtual Machine Bandwidth" with U.S. application Ser. No. 11/480,000; "Virtual Switch" with U.S. application Ser. No. 11/480,261; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,946; "Bridging Network Components" with U.S. application Ser. No. 11/479,948; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. 11/479,998; "Method and Apparatus for Dynamic Assignment of Network Interface Card Resources" with U.S. application Ser. No. 11/479,817; and "Serialization Queue Framework for Transmitting Packets" with U.S. application Ser. No. 11/479,143.

BACKGROUND

Network traffic is transmitted from a network, such as the Internet, from a sending system (e.g., a computer system) to a receiving system (e.g., a computer system) via a physical network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for processing packets. The method includes receiving a first packet, wherein the first packet is associated with a first protocol, classifying the first packet using a protocol associated with the first packet, sending the first packet to a first receive ring based on the classification, sending the first packet from the first receive ring to a first virtual network interface card (VNIC) based on an operating mode, sending the first packet from the first VNIC to a first protocol specific virtual network stack (VNS), wherein the first protocol specific VNS is configured to only process packets associated with the first protocol, and processing the first packet by the first protocol specific VNS to obtain a first processed packet.

In general, in one aspect, the invention relates to a method for processing packets. The method includes receiving a first packet, wherein the first packet is associated with a first protocol and a first packet destination, classifying the first packet based on packet destination using a hardware classifier, sending the first packet to a first receive ring based on the classification, sending the first packet to a software ring (SR), classifying the first packet using a protocol associated with the first packet, wherein the classification is performed by a software classifier in the SR, sending the first packet to a first software receive ring (SRR) based on the classification by software classifier, sending the first packet from the first SRR to a first virtual network interface card (VNIC) based on an operating mode, sending the first packet from the first VNIC to a first protocol specific virtual network stack (VNS), wherein the first protocol specific VNS is configured to only process packets associated with the first protocol, and processing the first packet by the first protocol specific VNS to obtain a first processed packet.

In general, in one aspect, the invention relates to a system, including a physical network interface card (NIC) operatively connected to a network, wherein the NIC comprises a hardware classifier, a first receive ring (RR) and a second RR, and wherein the hardware classifier is configured to send packets for a first packet destination to the first RR, and a host, operatively connected to the NIC, comprising: the first packet destination, a soft ring (SR) comprising a software classifier and a first soft receive ring (SRR) and a second SRR, wherein the first RR is operatively connected to the SR, wherein the SR is configured to classify each of the received packets based on a protocol associated with the packet, and send, after classifying, packets associated a first protocol to the first SRR and packets associated with a second protocol to the second SRR, a first virtual network interface card (VNIC), operatively connected to the first SRR, wherein the first VNIC is configured to obtain packets from the first SRR based on a first operating mode and send the packets to a first protocol specific Virtual Network Stack (VNS), a second VNIC operatively connected to the second SRR, wherein the second VNIC is configured to obtain packets from the second SRR based on a second operating mode and send the packets to a second protocol specific VNS, the first protocol specific VNS, operatively connected to the first VNIC, wherein the first protocol specific VNS is configured to process the packets to obtain first processed packets and send the first processed packets to the first packet destination, and the second protocol specific VNS, operatively connected to the second VNIC, wherein the second protocol specific VNS is configured to process the packets to obtain second processed packets and send the second processed packets to the first packet destination.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention a framework for processing protocol specific packets. More specifically, embodiments of the invention provide a framework for classifying packets on a per-protocol basis and then processing the packets using protocol specific virtual network stacks.

Figure 1:
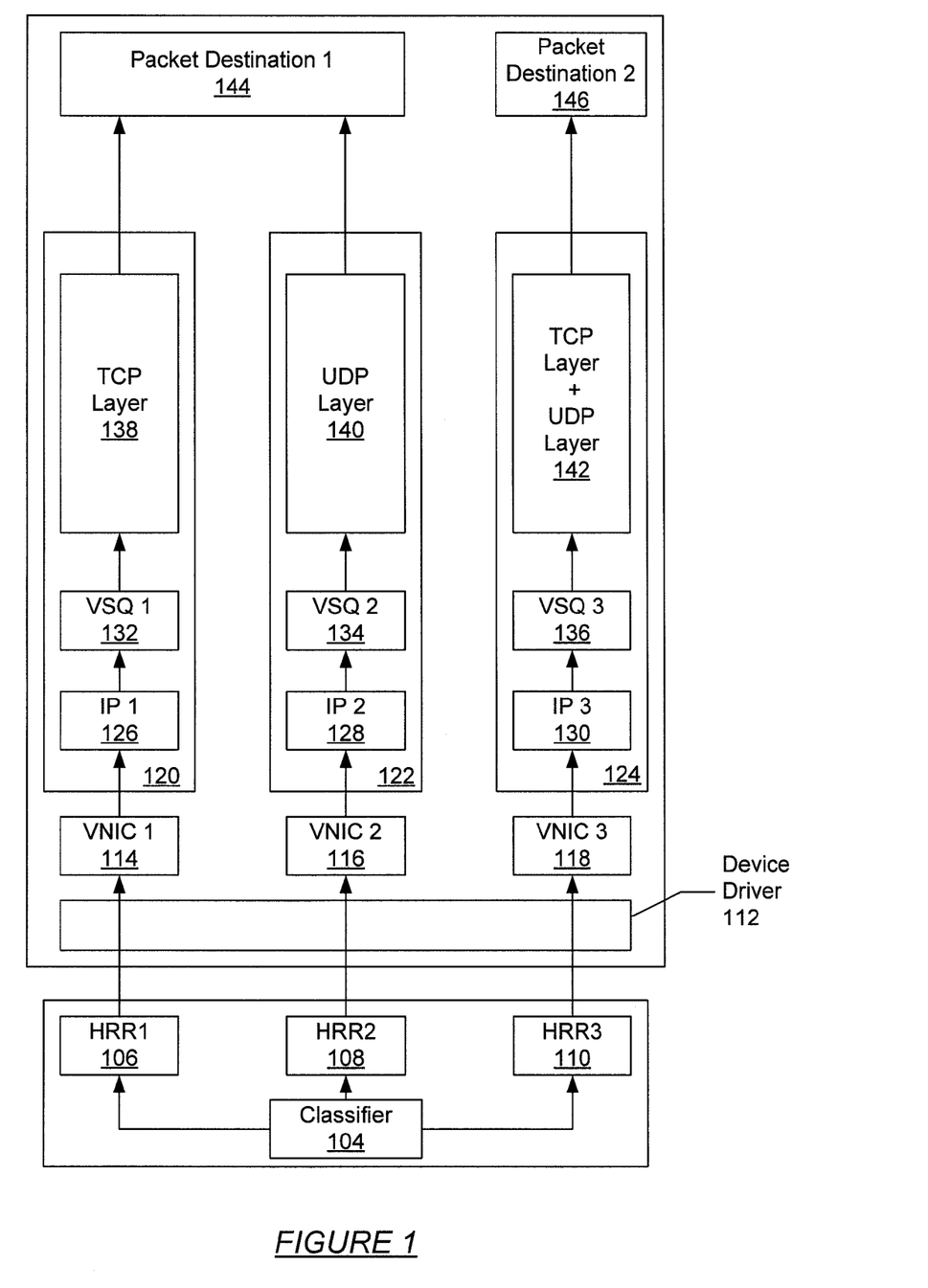
FIG. 1 shows a system in accordance with one embodiment of the invention.

FIG. 1 shows a system in accordance with one embodiment of the invention. As shown in FIG. 1, the system includes a host (102) operatively connected to a physical network interface card (NIC) (100). Each of the aforementioned components is discussed below in detail.

In one embodiment of the invention the NIC (100) includes a hardware classifier (104) a number of hardware receive rings (HRRs) (e.g., HRR1 (106), HRR2 (108), and HRR3 (110)). In one embodiment of the invention, each HRR corresponds to a portion of memory within the NIC (100) used to temporarily store the received packets after they have been classified by the hardware classifier (104).

In one embodiment of the invention, the NIC (104) is configured to receive packets from a network (not shown) (e.g., a Local Area Network (LAN), a Wide Area Network (WAN)) and send the received packets to the hardware classifier (104). The hardware classifier (104) is configured to classify the received packets based on programmed classification criteria in the hardware classifier (104).

In one embodiment of the invention, the hardware classifier (104) is configured to classify packets on a per-packet destination per-transport protocol basis. Said another way, the hardware classifier (104) includes functionality to identify the packet destination and the transport protocol such that each HRR includes packets corresponding to a specific packet destination and a specific transport level protocol (e.g., all TCP packets for packet destination 1 (144)).

Once the packets have been classified by the hardware classifier (104), they are sent to the appropriate HRR (e.g., HRR1 (106), HRR2 (108), and HRR3 (110)). In one embodiment of the invention, each of the HRRs (e.g., HRR1 (106), HRR2 (108), and HRR3 (110)) is bound to a virtual network interface card (VNIC) (e.g., VNIC 1 (114), VNIC 2 (116), VNIC 3 (118)). In one embodiment of the invention, a VNIC corresponds to a software component in the Media Access Control (MAC) layer (not shown) in the host (102). Each VNIC (e.g., VNIC 1 (114), VNIC 2 (116), VNIC 3 (118)) includes the functionality of a physical NIC. In one embodiment of the invention, each VNIC is associated with at least one MAC address and at least one Internet Protocol (IP) address.

Further, to all components conceptually above the VNIC (e.g., the Virtual Network Stacks (VNSs) (e.g., 120, 122, and 124) and the Packet Destinations (e.g., 144, 146), the VNICs appear as physical NICs. Thus, to packet destinations (e.g., 144, 146) in the host (102), there are three physical NICs, namely, VNIC 1 (114), VNIC 2 (116), and VNIC 3 (118). In one embodiment of the invention, all components conceptually above the VNICs are not aware that the VNICs are connected to the physical NIC (100).

Continuing with the discussion of FIG. 1, each of the VNICs is in turn bound to a VNS (e.g., 120, 122, 124). In one embodiment of the invention, each VNS may be configured to handle a specific transport level protocol (e.g., Transmission Control Protocol (TCP), User Datagram Protocol (UDP)) or handle all transport level protocols.

In one embodiment of the invention, each VNS (e.g., 120, 122, 124) includes an Internet Protocol (IP) Layer (e.g., IP 1 (126), IP 2 (128), IP 3 (130)), a virtual serialization queue (VSQ) (e.g., VSQ 1 (132), VSQ 2 (134), VSQ 3 (136)) and a protocol specific transport layer (e.g., TCP Layer (138), UDP Layer (140)) or a generic transport layer (e.g., TCP Layer+ UDP Layer (142)).

In one embodiment of the invention, the IP layer (e.g., IP 1 (126), IP 2 (128), IP 3 (130)) is configured to perform IP level processing of packets received from the VNICs (e.g., VNIC 1 (114), VNIC 2 (116), VNIC 3 (118)).

In one embodiment of the invention, each VSQ (e.g., VSQ 1 (132), VSQ 2 (134), VSQ 3 (136)) corresponds to a queue data structure and is configured to queue packets prior to processing of the packets by the associated transport layer (e.g., TCP Layer (138), UDP Layer (140), etc.). Each VSQ (e.g., VSQ 1 (132), VSQ 2 (134), VSQ 3 (136)) is configured to process packets in accordance with configuration parameters associated with the specific VSQ.

For example, if the VSQ is located in a VNS that includes a protocol specific transport layer corresponding to a TCP layer (e.g., VSQ 1 (132) in VNS (120)), then the configuration parameter may specify that each thread accessing the VSQ must implement a mutual exclusion policy. Said another way, the VSQ may be configured to only allow one thread to access the VSQ at a time. This functionality may be achieved by associating the VSQ with a single lock and only allowing a thread to access the VSQ if the thread has acquired the lock.

Alternatively, if the VSQ is located in a VNS that includes a protocol specific transport layer corresponding to a UDP layer (e.g., VSQ 2 (134) in VNS (122)), then the configuration parameter may specify that multiple threads may concurrently access the VSQ to allow for concurrent processing of packets.

In one embodiment of the invention, the configuration parameters associated with a given VSQ are consistent with the packet processing requirements imposed by the transport layer protocol (e.g., TCP, UDP, etc.). Further, if the VSQ includes a generic transport layer (e.g., 142), then the configuration parameters for the VSQ are set to conform to the packet processing requirements of the more stringent transport level protocol. For example, if the generic transport layer is configured to process both TCP and UDP packets, then the configuration parameters associated with the corresponding VSQ are set to conform to the packet processing requirements of TCP.

In addition to queuing the packets received from the corresponding IP layer, each VSQ also included functionality to enforce bandwidth usage of a particular VNS. In one embodiment of the invention, bandwidth usage is controlled by operating the VNS in polling mode. When the VNS is operating in polling mode, packets for a given VNS are queued in the corresponding HRR until a request for a specified number of packets is received from the corresponding VSQ (or a process related to the VSQ). Upon receiving a request for packets, the specified number of packets is sent from the HRR to the corresponding VNS via the associated VNIC. Once packets are received by the VSQ they are processed in accordance with the configuration parameters associated with the VSQ.

Alternatively, the packets may be processed using an interrupt mode. When the host is operating in interrupt mode, each packet placed a HRR is immediately sent to the appropriate VNIC through the issuance of an interrupt. In one embodiment of the invention, the device driver (112) includes functionality to manage the flow of packets, regardless of operating mode, from the HRRs to the appropriate VNICs.

In one embodiment of the invention, the TCP layer (138) includes functionality to process packets in accordance with TCP, the UDP layer (140) includes functionality to process packets in accordance with UDP, and the generic transport layer (142) includes functionality to process in accordance with either TCP or UDP.

Once the packets have been processed by the appropriate transport layer, the processed packets are sent to the appropriate packet destinations (144, 146). In one embodiment of the invention, the packet destination (144, 146) corresponds to any process configured to receive packets. For example, the packet destination may correspond to, but is not limited to, an application, a virtual machine, a container, etc.

Figure 2:
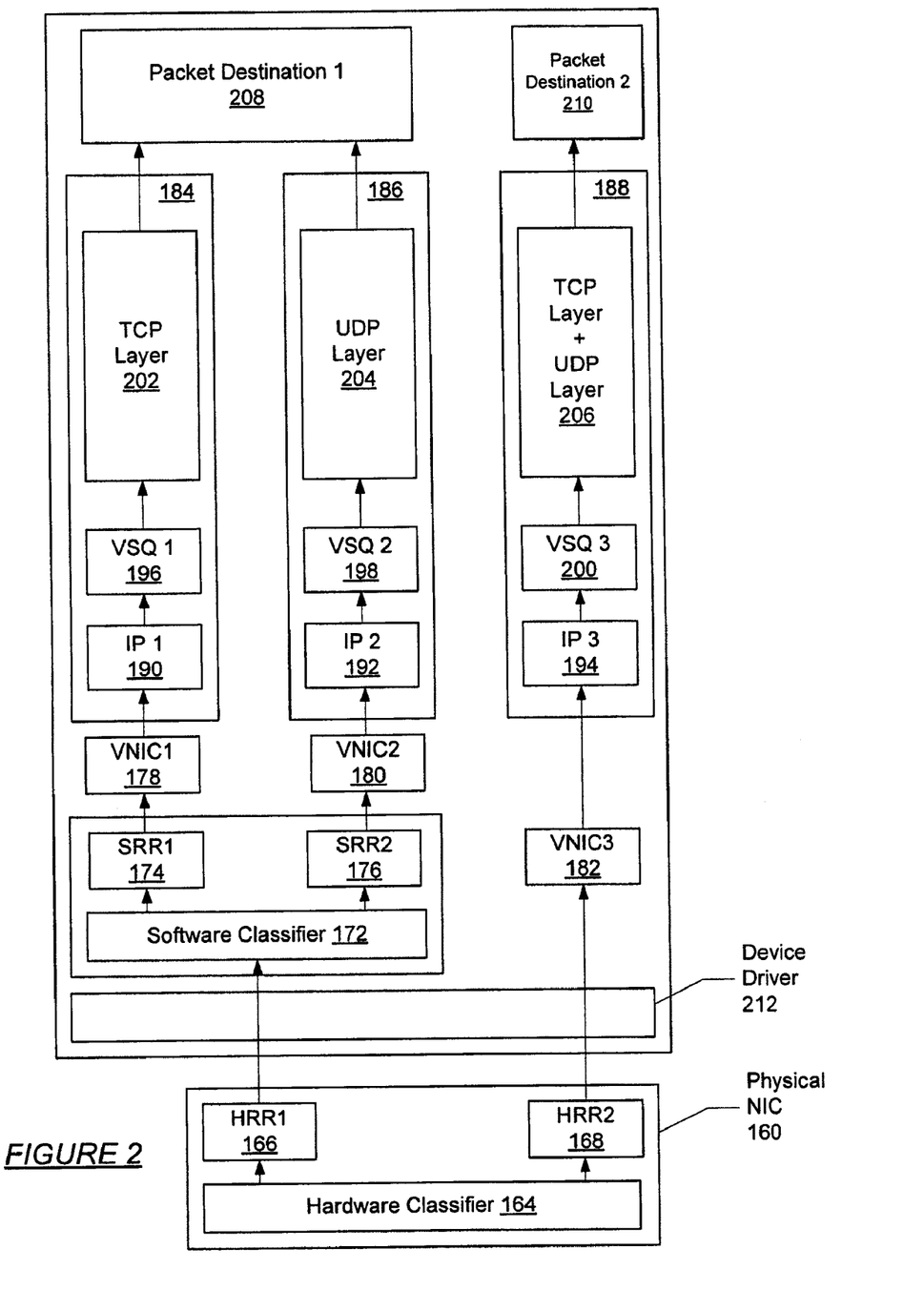
FIG. 2 shows a system in accordance with one embodiment of the invention

FIG. 2 shows a system in accordance with one embodiment of the invention. As shown in FIG. 2, the system includes a host (162) operatively connected to a physical network interface card (NIC) (100). Each of the aforementioned components is discussed below.

In one embodiment of the invention the NIC (160) includes a hardware classifier (164) a number of hardware receive rings (HRRs) (e.g., HRR1 (166) and HRR2 (168)). In one embodiment of the invention, each HRR corresponds to a portion of memory within the NIC (160) used to temporarily store the received packets after they have been classified by the hardware classifier (164).

In one embodiment of the invention, the NIC (164) is configured to receive packets from a network (not shown) (e.g., a Local Area Network (LAN), a Wide Area Network (WAN)) and send the received packets to the hardware classifier (164). The hardware classifier (164) is configured to classify the received packets based on programmed classification criteria in the hardware classifier (164).

In one embodiment of the invention, the hardware classifier (164) is configured to classify packets on a per-packet destination basis, on a per-transport protocol basis, or on a per-packet destination per-transport protocol basis. For example, the hardware classifier (164) may be configured such that packets received for packet destination 1 (208) may be classified on a packet destination basis, while packet destination 2 (210) may be classified on a per-packet destination per-protocol basis. In the embodiment shown in FIG. 2, the packets sent to packet destination 2 (210) using a transport protocol other than TCP will be dropped by the NIC (160).

Continuing with the discussion of FIG. 2, once the packets have been classified by the hardware classifier (164), the packets are sent to the appropriate HRR (e.g., HRR1 (166), HRR2 (168)). In one embodiment of the invention, each of the HRRs (e.g., HRR1 (166), HRR2 (168)) may be bound to a virtual network interface card (VNIC) (e.g., VNIC 3 (182)) or a soft ring (SR) (170).

In one embodiment of the invention, the SR (170) is a software component in the MAC layer (not shown) of the host (162). The SR (170) includes a software classifier (172) and a number of software receive rings (e.g., SRR1 (174) and SRR2 (1176)). In one embodiment of the invention, the SR (170) is bound to an HRR and is configured to receive packets from that HRR. In one embodiment of the invention, each SRR corresponds to a temporary data structure configured to store classified packets (e.g., packets that have been classified by the software classifier (172)). Further, each SRR is bound to a VNIC (e.g., VNIC 1 (178) and VNIC 2 (180). Once the packets have been received by the SR (170), the software classifier (172) is configured to classify the packets on a per-protocol basis (e.g., transport protocol basis). Once the packets are classified, the packets are sent to the appropriate SRR.

In one embodiment of the invention, a VNIC corresponds to a software component in the MAC layer (not shown) in the host (162). Each VNIC (e.g., VNIC 1 (178), VNIC 2 (180), VNIC 3 (182)) includes the functionality of a physical NIC. Further, to all components conceptually above the VNIC (e.g., the Virtual Network Stacks (VNSs) (e.g., 184, 186, and 188) and the Packet Destinations (e.g., 208, 210), the VNICs appear as physical NICs. Thus, to packet destinations (208, 210) in the host (162), there are three physical NICs, namely, VNIC 1 (178), VNIC 2 (180), and VNIC 3 (182). In one embodiment of the invention, all components conceptually above the VNICs are not aware that the VNICs are connected to the physical NIC (160).

Continuing with the discussion of FIG. 2, each of the VNICs is in turn bound to a VNS (e.g., 184, 186, 188). In one embodiment of the invention, each VNS may be configured to handle a specific transport level protocol (e.g., Transmission Control Protocol (TCP), User Datagram Protocol (UDP)) or handle all transport level protocols.

In one embodiment of the invention, each VNS (184, 186, 188) includes an Internet Protocol (IP) Layer (e.g., IP 1 (192), IP 2 (194), IP 3 (196)), a virtual serialization queue (VSQ) (e.g., VSQ 1 (196), VSQ 2 (198), VSQ 3 (200)) and a protocol specific transport layer (e.g., TCP Layer (202), UDP Layer (204)) or a generic transport layer (e.g., TCP Layer+UDP Layer (not shown)).

In one embodiment of the invention, the IP layer (e.g., IP 1 (190), IP 2 (192), IP 3 (194)) is configured to perform IP level processing of packets received from the VNICs (VNIC 1 (178), VNIC 2 (180), VNIC 3 (182)).

In one embodiment of the invention, each VSQ (e.g., VSQ 1 (1196), VSQ 2 (198), VSQ 3 (200)) corresponds to a queue data structure and is configured to queue packets prior to processing of the packets by the associated transport layer (e.g., TCP Layer (202), UDP Layer (204), etc.). Each VSQ (VSQ 1 (1196), VSQ 2 (198), VSQ 3 (200)) is configured to process packets in accordance with configuration parameters associated with the specific VSQ.

For example, if the VSQ is located in a VNS that includes a protocol specific transport layer corresponding to a TCP layer (e.g., VSQ 1 (198) in VNS (184)), then the configuration parameter may specify that each thread accessing the VSQ must implement a mutual exclusion policy. Said another way, the VSQ may be configured to only allow one thread to access the VSQ at a time. This functionality may be achieved by associating the VSQ with a single lock and only allowing a thread to access the VSQ if the thread has acquired the lock.

Alternatively, if the VSQ is located in a VNS that includes a protocol specific transport layer corresponding to a UDP layer (e.g., VSQ 2 (198) in VNS (186)), then the configuration parameter may specify multiple threads may concurrently access the VSQ to allow for concurrent processing of the packets.

In one embodiment of the invention, the configuration parameters associated with a given VSQ are consistent with the packet processing requirements imposed by the transport layer protocol (e.g., TCP, UDP, etc.). Further, if the VSQ includes a generic transport layer (not shown), then the configuration parameters for the VSQ are set to conform to the packet processing requirements of the more stringent transport level protocol. For example, if the generic transport layer is configured to process both TCP and UDP packets, then the configuration parameters associated with the corresponding VSQ are set to conform to the packet processing requirements of TCP.

In addition to queuing the packets received from the corresponding IP layer, each VSQ also included functionality to enforce bandwidth usage of a particular VNS. In one embodiment of the invention, bandwidth usage is controlled by operating the VNS in polling mode. When the VNS is operating in polling mode, packets for a given VNS are queued in the corresponding HRR until a request for a specified number of packets is received from the corresponding VSQ (or a process related to the VSQ). Upon receiving a request for packets, the specified number of packets is sent from the HRR to the corresponding VNS via the associated VNIC. Once packets are received by the VSQ they are processed in accordance with the configuration parameters associated with the VSQ.

Alternatively, the packets may be processed using an interrupt mode. When the host is operating in interrupt mode, each packet placed a HRR is immediately sent to the appropriate VNIC through the issuance of an interrupt. In one embodiment of the invention, the device driver (212) include manage the flow of packets, regardless of operating mode, from the HRRs to the appropriate VNICs.

In one embodiment of the invention, the TCP layer (202) includes functionality to process packets in accordance with TCP, the UDP layer (204) includes functionality to process packets in accordance with UDP, and the generic transport layer (not shown) includes functionality to process in accordance with either TCP or UDP.

Once the packets have been processed by the appropriate transport layer, the processed packets are sent to the appropriate packet destinations (208, 210). In one embodiment of the invention, the packet destination (208, 210) corresponds to any process configured to receive packets. For example, the packet destination may correspond to, but is not limited to, an application, a virtual machine, or a container.

Though not shown in FIG. 1 or 2, the host may include multiple software classifiers each configured to classify packets on a per-protocol basis for a given packet destination. In such cases, there is one soft ring for each packet destination and one software receive ring for each transport level protocol used by the packet destination. The classified packets are placed in the appropriate software receive ring by the software classifier and then subsequently sent (using either polling or interrupt mode) to the corresponding VNS.

Though not shown in FIG. 1 or 2, the NIC may not include any functionality to classify packets. In such cases all packets for all destinations are sent to software ring on the host. Upon receipt of the packet, the software classifier in the software ring classifies the packets on a per-packet destination per-protocol (e.g., transport protocol) basis. The classified packets are placed in the appropriate software receive ring and then subsequently sent (using either polling or interrupt mode) to the corresponding VNS.

In one embodiment of the invention, each VNS may operate in polling mode or in interrupt mode. Said another way, one VNS may be operating using polling mode while a second concurrently operating VNS may be using interrupt mode.

Further, each VNS may be associated with a specified bandwidth, where the specified bandwidth is enforced using polling mode.

Figure 3:
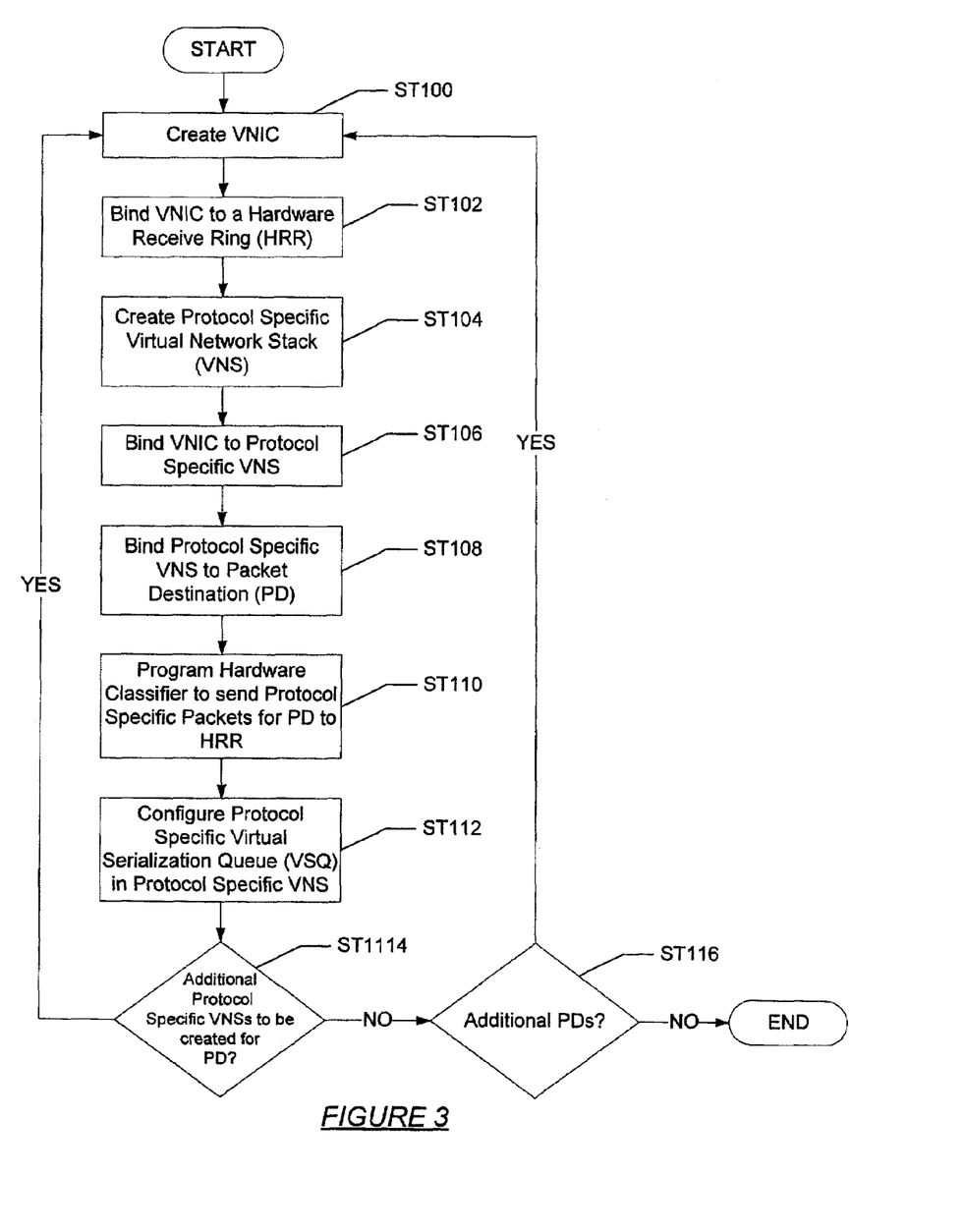
FIGS. 3-5 show flow charts in accordance with one or more embodiments of the invention.

FIG. 3 shows a flow chart in accordance with one or more embodiments of the invention. More specifically, FIG. 3 shows a method for setting up the system shown in FIG. 1 in accordance with one embodiment of the invention.

Initially, a VNIC is created on the host (ST100). The VNIC is subsequently bound to a hardware receive ring (HRR) (ST102). A protocol specific virtual network stack (VNS) is then created on the host (ST104). The protocol specific VNS is subsequently bound to the VNIC (ST106). The protocol specific VNS is then bound to a packet destination, where the packet destination (PD) resides on the host (ST108). The hardware classifier in the physical network interface card (NIC) operatively connected to the host, is subsequently programmed (ST110).

In one or more embodiments of the invention, programming the hardware classifier corresponds to programming the hardware classifier to send packets destined for the PD (e.g., the PD bound to the protocol specific VNS in ST108) with a transport protocol corresponding to the protocol specific VNS (e.g., the protocol specific VNS created in ST104) to the HRR bound to the VNIC in ST102. For example, if the protocol specific VNS is configured to process TCP packets, then the hardware classifier is programmed to send all TCP packets for the PD to the HRR specified in ST102.

Continuing with the discussion of FIG. 3, once the hardware classifier has been programmed, the virtual serialization queue (VSQ) in the protocol specific VNS is configured (ST112). More specifically, the configuration parameters for the VSQ are specified. In one embodiment of the invention, ST112 may be performed at the time the protocol specific VNS is created.

After ST112, a determination is made whether any additional protocol specific VNSs need to be created for the PD (ST114). If additional protocol specific VNSs need to be created, then the process proceeds to ST100.

If no additional protocol specific VNSs are need, then the process proceeds to ST116. At ST116, a determination is made whether any additional PD exist for which ST100-ST114 need to be performed. If additional PDs require ST100-ST114 to be performed, then the process proceeds to ST100. Alternatively, the process ends.

In one embodiment of the invention, the method shown in FIG. 3 may be performed each time a new PD is added to the host. Further, the method shown in FIG. 3 may be performed while the host is executing.

Figure 4:
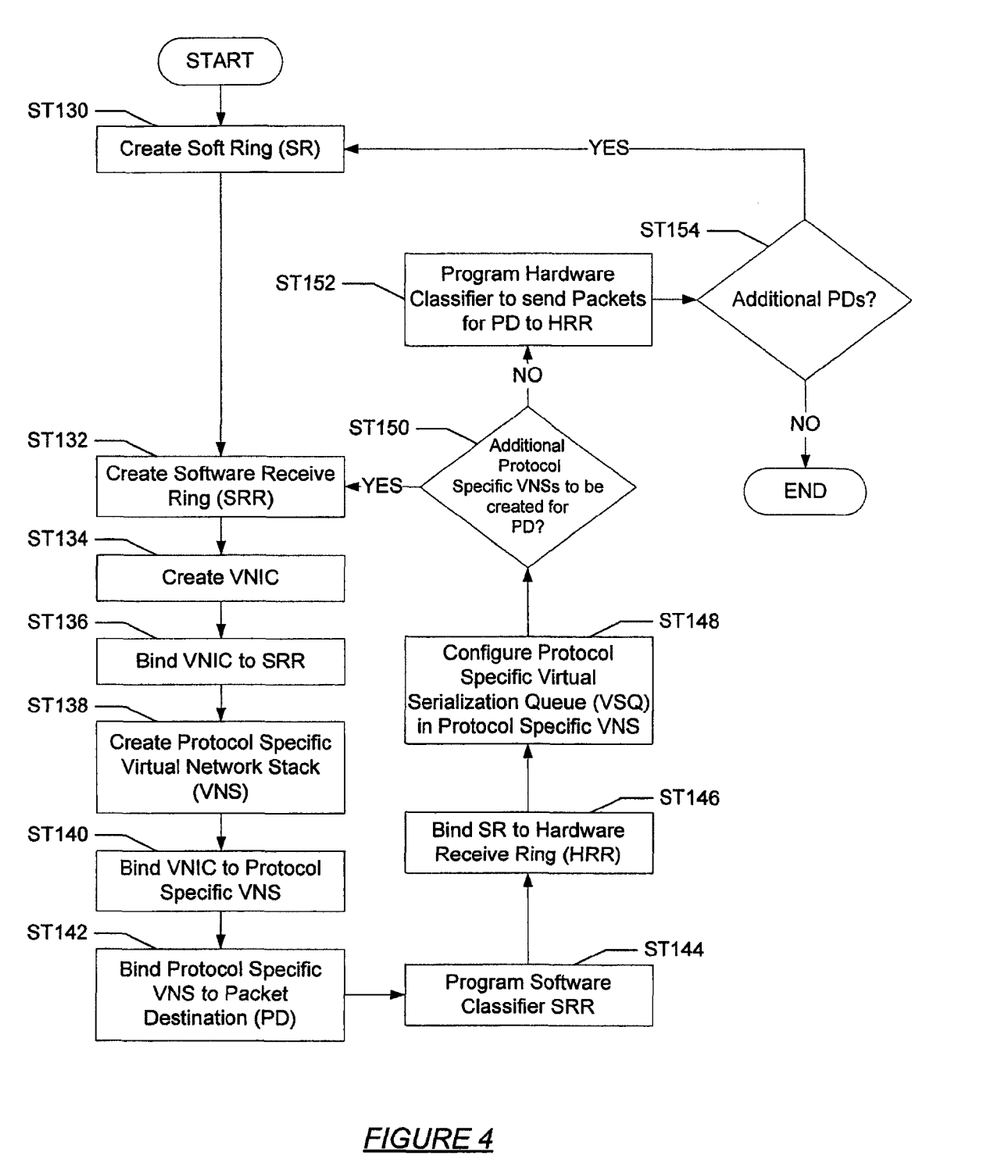

FIG. 4 shows a flow chart in accordance with one or more embodiments of the invention. More specifically, FIG. 4 shows a method for setting up the system shown in FIG. 2 in accordance with one embodiment of the invention.

Initially, a soft ring (SR) is created on the host (ST130). A software receive ring (SRR) is subsequently created in the SR (ST132). A virtual network interface card (VNIC) is subsequently created (ST134) and bound to the SRR (ST136). A protocol specific virtual network stack (VNS) is then created (ST138) and bound to the VNIC (ST140). The protocol specific VNS is also bound to a packet destination (PD).

The software classifier is subsequently programmed to classify packets on a per-protocol basis (e.g., transport protocol basis) and to send the classified packets to the SRR (ST144). The SR is then bound to a hardware receive ring (HRR) in a physical network interface card operatively connected to the host (ST146). The virtual serialization queue (VSQ) in the protocol specific VNS is then configured (ST148). More specifically, the configuration parameters for the VSQ are specified. In one embodiment of the invention, ST148 may be performed at the time the protocol specific VNS is created.

After ST148, a determination is made whether any additional protocol specific VNSs need to be created for the PD (ST150). If additional protocol specific VNSs need to be created, then the process proceeds to ST132.

If no additional protocol specific VNSs are needed, then the process proceeds to ST152. The hardware classifier, located on the physical NIC, is subsequently programmed to classify packets on a per-packet destination basis and to send the classified packets to the HRR specified in ST146 (ST152). At ST154, a determination is made whether any additional PDs exist for which ST130-ST152 need to be performed. If additional PDs require ST130-ST152 to be performed, then the process proceeds to ST130. Alternatively, the process ends.

Figure 5:
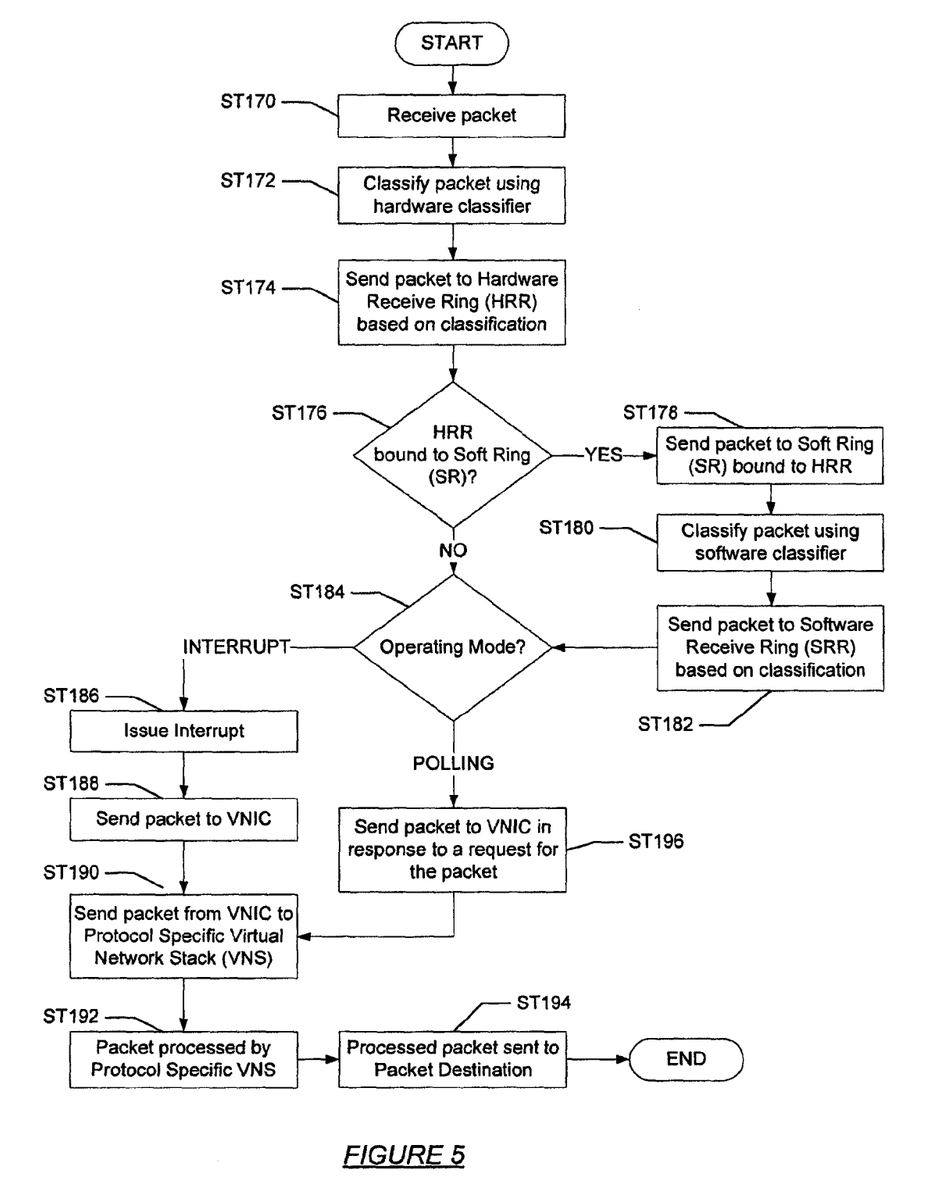

FIG. 5 shows a flow chart in accordance with one or more embodiments of the invention. More specifically, FIG. 5 shows a method for processing a packet in accordance with one embodiment of the invention.

Initially, a packet is received by a physical network interface card (NIC) operatively connected to a host (ST170). The packet is subsequently classified by a hardware classifier in the physical NIC (ST172). In one embodiment of the invention, if the host implements a soft ring (SR), then the hardware classification is performed on a per-packet destination basis. Alternatively, if the if the host does not implement a SR, then the hardware classification is performed on a per-protocol and a per-packet destination basis. As discussed above, the hardware classification may be a combination of the above embodiments.

Returning to FIG. 5, the classified packet is subsequently sent to the appropriate hardware receive ring (HRR). If the HRR is bound to a SR (ST176), then the process proceeds to ST178. Alternatively, if the HRR is not bound to the SR (e.g., the HRR is bound to a VNIC), then the process proceeds to ST184.

Turing to ST178, the packet in the HRR is subsequently sent to the SR (ST178). In one embodiment of the invention, the SR may implement bandwidth control in the form of a polling mode (discussed above) such that the SR can control the number of packets that are sent to the SR at any given time. Alternatively, the host may only support interrupt mode with respect to the SR, in which case, once a packet is placed in the HRR, it is automatically sent (via the issuance of an interrupt) to the SR.

Once the packet is received by the SR, the packet is classified by the software classifier (ST180). Once the packet has been classified by the software classifier, the packet is sent to the appropriate software receive ring (SRR) (ST182). At this stage the process proceeds to ST184.

With respect to ST184, if the VNS with which the HRR or SRR is bound is operating in interrupt mode, then the process proceeds to ST186. Alternatively, if the VNS with which the HRR or SRR is bound is operating in polling mode, the process proceeds to ST196.

With respect to ST186, an interrupt is issued (ST186) and the packet is sent to the appropriate VNIC (e.g., the VNIC bound to the HRR or SRR) (ST190). The packet is then sent from the VNIC to the appropriate protocol specific VNS (e.g., the appropriate protocol specific VNS bound to the VNIC) (ST192). The packet is subsequently processed by the protocol specific VNS (ST192) and then the processed packet is sent to the packet destination (ST194)). With respect to ST196, the packet remains in the HRR or SRR until a request for the packet (or a number of packets) is received (ST196). The process then proceeds to ST190.

Those skilled in the art will appreciate that the above invention may be extended to cover additional transport layer protocol in addition to TCP and UDP.

Figure 6:
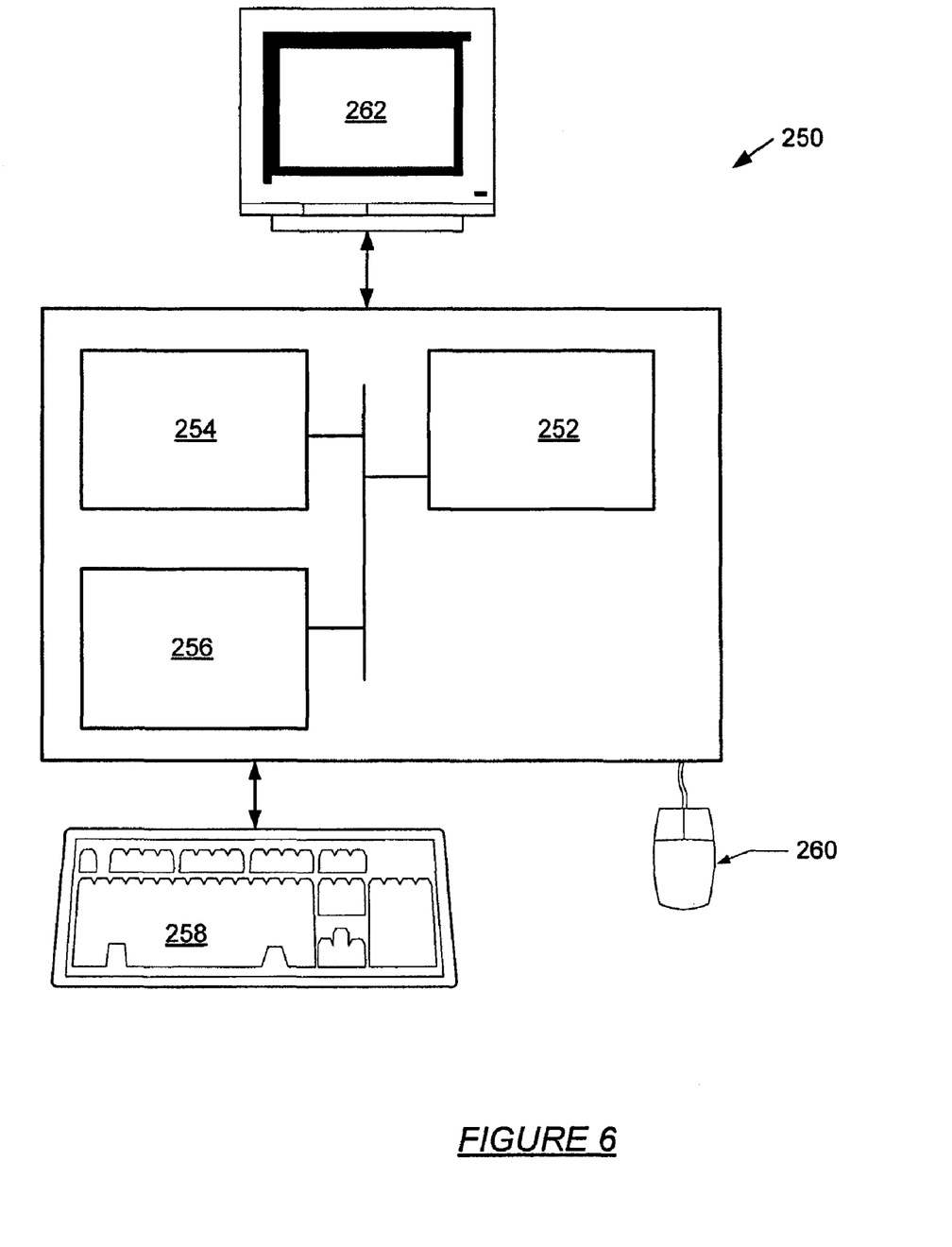
FIG. 6 shows a computer system in accordance with one embodiment of the invention.

An embodiment of the invention may be implemented on virtually any type of computer regardless of the platform being used. For example, as shown in FIG. 6, a networked computer system (250) includes a processor (252), associated memory (254), a storage device (256), and numerous other elements and functionalities typical of today's computers (not shown). The networked computer (250) may also include input means, such as a keyboard (258) and a mouse (260), and output means, such as a monitor (262). The networked computer system (250) is connected to a local area network (LAN) or a wide area network via a network interface connection (not shown). Those skilled in the art will appreciate that these input and output means may take other forms. Further, those skilled in the art will appreciate that one or more elements of the aforementioned computer (250) may be remotely located and connected to the other elements over a network. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions for processing packets, wherein the software instructions, when executed by a processor, perform a method, the method comprising:
    receiving a first packet, wherein the first packet is associated with a first protocol and a packet destination;
    classifying the first packet using the first protocol and the packet destination;
    sending the first packet to a first receive ring based on the classification;
    sending the first packet from the first receive ring to a first virtual network interface card (VNIC) based on an operating mode;
    sending the first packet from the first VNIC to a first protocol specific virtual network stack (VNS), wherein the first protocol specific VNS is configured to only process packets associated with the first protocol, and wherein the first protocol specific VNS is associated with the packet destination; and
    processing the first packet by the first protocol specific VNS to obtain a first processed packet;
    receiving a second packet, wherein the second packet is associated with a second protocol and the packet destination;
    classifying the second packet using the second protocol and the packet destination;
    sending the second packet to a second receive ring based on the classification;
    sending the second packet from the second receive ring to a second VNIC based on the operating mode;
    sending the second packet from the second VNIC to a second protocol specific VNS; and
    processing the second packet by the second protocol specific VNS to obtain a second processed packet,
    wherein the first protocol specific VNS comprises a first virtual serialization queue (VSQ) and the second protocol specific VNS comprises a second VSQ,
    wherein the first VSQ is associated with a first configuration parameter and the second VSQ is associated with a second configuration parameter,
    wherein the first configuration parameter specifies that any thread accessing the first VSQ implements a mutual exclusion policy, and
    wherein the second configured parameter specifies that multiple threads may concurrently access the second VSQ.

2. The non-transitory computer readable medium of claim 1, the method further comprising:
    sending the first processed packet and the second processed packet to the first packet destination.

3. The non-transitory computer readable medium of claim 1, wherein the operating mode is one selected from a group consisting of polling mode and interrupt mode.

4. The non-transitory computer readable medium of claim 1, wherein the first protocol is Transmission Control Protocol (TCP) and the second protocol is User Datagram Protocol (UDP).

5. A method for processing packets, comprising:
    receiving a first packet, wherein the first packet is associated with a first protocol and a first packet destination;
    classifying the first packet based on packet destination using a hardware classifier;
    sending the first packet to a first receive ring based on the classifying;
    sending the first packet to a software ring (SR);
    classifying, by a software classifier in the SR, the first packet using a protocol associated with the first packet;
    sending the first packet to a first software receive ring (SRR) based on the classification by software classifier;
    sending the first packet from the first SRR to a first virtual network interface card (VNIC) based on an operating mode;
    sending the first packet from the first VNIC to a first protocol specific virtual network stack (VNS), wherein the first protocol specific VNS is configured to only process packets associated with the first protocol, and where the first protocol specific VNS is associated with the first packet destination; and
    processing the first packet by the first protocol specific VNS to obtain a first processed packet;
    receiving a second packet, wherein the second packet is associated with a second protocol and a second packet destination;
    classifying the second packet based on packet destination using the hardware classifier;
    sending the second packet to a second receive ring based on the classifying by the hardware classifier;
    sending the second packet to the SR;
    classifying the second packet using a protocol associated with the second packet, wherein the classification is performed by the software classifier in the SR;
    sending the second packet to a second software receive ring (SRR) based on the classification by software classifier;
    sending the second packet from the second SRR to a second virtual network interface card (VNIC) based on the operating mode;
    sending the second packet from the second VNIC to a second protocol specific virtual network stack (VNS), wherein the second protocol specific VNS is configured to only process packets associated with the second protocol, and wherein the second protocol specific VNS is associated with the second packet destination; and processing the second packet by the second protocol specific VNS to obtain a second processed packet, wherein the first protocol specific VNS comprises a first virtual serialization queue (VSQ) and the second protocol specific VNS comprises a second VSQ, and wherein the first VSQ is associated with a first configuration parameter and the second VSQ is associated with a second configuration parameter, wherein the first configuration parameter specifies that any thread accessing the first VSQ implements a mutual exclusion policy and wherein the second configured parameter specifies that multiple threads may concurrently access the second VSQ.

6. The method of claim 5, further comprising:
sending the first processed packet to the first packet destination; and
sending the second processed packet to the second packet destination.

7. The method of claim 5, wherein the operating mode is one selected from the group consisting of polling mode and interrupt mode.

8. The method of claim 5, wherein the first protocol is Transmission Control Protocol (TCP) and the second protocol is User Datagram Protocol (UDP).

\* \* \* \* \*